United States Patent
Hass et al.

[11] Patent Number: 5,972,140
[45] Date of Patent: Oct. 26, 1999

[54] METHOD OF FABRICATING MULTILAYER STRUCTURES WITH NONPLANAR SURFACES

[75] Inventors: Allan R. Hass, San Diego, Calif.; Joseph M. Dynys, New Kensington, Pa.

[73] Assignee: Aluminum Company of America, Pittsburgh, Pa.

[21] Appl. No.: 08/203,840

[22] Filed: Feb. 28, 1994

Related U.S. Application Data

[63] Continuation of application No. 07/897,791, Jun. 12, 1992, abandoned.

[51] Int. Cl.$^6$ .................................................. C04B 37/00
[52] U.S. Cl. ..................... 156/89.11; 156/94; 156/242; 156/288; 156/289; 156/323
[58] Field of Search ........................... 156/89, 94, 242, 156/288, 289, 323, 89.11

[56] References Cited

U.S. PATENT DOCUMENTS

| | | | |
|---|---|---|---|
| 4,528,354 | 7/1985 | McDougal | 264/331.11 |
| 4,636,275 | 1/1987 | Norell | 156/289 |
| 4,680,075 | 7/1987 | McNeal et al. | 156/323 |
| 4,737,208 | 4/1988 | Bloechle et al. | 156/323 |
| 5,116,440 | 5/1992 | Takeguchi et al. | 156/323 |

Primary Examiner—Christopher A. Fiorilla
Attorney, Agent, or Firm—David W. Pearce-Smith

[57] ABSTRACT

A method of fabricating a plurality of multilayer structures which includes at least one recess defined by a nonplanar surface. The method including the steps of: (a) providing a resilient, compliant material on over one or more stacks of layers including the area over the recess; (b) applying sufficient pressure to the stacks to cause the resilient, compliant material to fill the recess and laminate said stacks; (c) lifting the resilient, compliant material off the stack subsequent to the application of pressure; (d) providing one or more stacks of layers that have not been subjected to step (b); and (e) repeating steps (a)–(d). In a preferred embodiment of the invention steps (a)–(d) are repeated at least ten times without the need to change the resilient compliant material. In a most preferred embodiment of the invention steps (a)–(d) are repeated at least one hundred times.

24 Claims, 2 Drawing Sheets

METHOD OF FABRICATING MULTILAYER STRUCTURES WITH NONPLANAR SURFACES

This application is a continuation of application Ser. No. 07/897,791, filed Jun. 12, 1992 now abandoned.

FIELD OF THE INVENTION

The invention relates to methods of fabricating laminated structures. More particularly, the present invention relates to methods of fabricating ceramic laminated structures used in the electronics industry.

BACKGROUND OF THE INVENTION

Electronic ceramic packages basically comprise laminated layers with conductors on and through one or more major surfaces of each layer. The layers are bonded together by applying heat and pressure. For some applications, one or more central cavities are formed. These cavities are stair-case shaped and formed for receiving a semiconductor chip which is bonded and electrically connected to metal pads which are exposed on the various layers or steps of the stair-case. Often the package is subsequently attached to a standard printed wiring board that contains other components.

One of the problems associated with fabricating this structure involves the bending and deformation of wire bonding pads during the bonding process. Deformed and distorted wire bonding pads are not suitable for automated wire bonding.

Another problem associated with fabricating this type of structure involves delamination of the various layers. Multilayer packages containing cavities for receiving semiconductor chips often require multiple pressings, usually three or four pressings, to laminate the stairs within the cavity. The pressings are typically performed between rigid platens of a parallel platen press. Parallel platens require multiple pressings because they cannot simultaneously press the top, bottom and horizontal surfaces within the cavity.

However, the cross sectional thickness of the layers varies considerably from end to end. This is the result, in part, of patterns of electrically conductive paste that are formed on at least some of the layers. The conductive paste forms the internal electrical pathways of the final package. When pressed between parallel rigid platens, the nonuniformity of the thickness of the stack causes local variations in the pressure across the stack's surface. Pressure variations are undesirable in that they can distort the package beyond acceptable dimensional tolerances and/or result in poor lamination.

In addition, fabricating practices that require multiple pressings are inefficient. In general, they increase both the operating expense and capital expenditures.

U.S. Pat. No. 4,636,275 to Norell discloses an elastic bladder method of fabricating an integrated circuit package having bonding pads in a stepped cavity. The patent teaches a method which includes the use of a bladder which fills with fluid during the lamination process to match the shape of the cavity and prevent the flow of interlayer adhesive, integral to this process.

U.S. Pat. No. 4,680,075 to McNeal et al discloses a thermoplastic plug method of fabricating an integrated circuit package having bonding pads in a stepped cavity. The patent teaches a method in which a preformed thermoplastic plug which has a shape that closely matches the shape of the cavity is used to prevent adhesive between layers from flowing out of the stack of sheets onto bonding pads on the steps of the stair-case cavity. The McNeal et al process require the fabrication of new plugs and such fabrication of new plugs is time consuming and expensive. In addition, production costs increase due to the time required to install the plug and remove the plug after lamination.

U.S. Pat. No. 4,737,208 issued to Blochle et al discloses a method of fabricating multilayer structures with nonplanar surfaces. A conformable material, a release material, and an optional template are provided over the structure prior to the lamination bonding operation. The conformal and release materials then fill the cavity during the bonding operation to prevent flow of adhesive from between the layers into the cavity, and the template redistributes cavity edge stresses to minimize deflection of the wire bonding pads. The conformal and release materials are then discarded. The template can be reused.

It is, therefore, a primary objective of the invention is to provide a method of manufacturing multiple layer structures with cavities therein so as to maximize product quality and minimize manufacturing costs.

Another objective of the invention is to provide a method of manufacturing multiple layer structures with cavities capable of decreasing defects resulting from nonuniform application of pressure during lamination.

Another objective of the invention to is provide a method of manufacturing multiple layer structures with cavities that can be laminated in a single pressing.

Yet another objective of the invention is to provide a method of manufacturing multiple layer structures with cavities therein so as to prevent the bending and distortion of wire bonding pads that can interfere with automated wire bonding.

Still another objective of the invention to provide a method of manufacturing multiple layer structures with cavities that can be repeatedly practiced without the need to change conformal material that is being used in the press operation.

These and other objectives and advantages of the present invention will be more fully understood and appreciated with reference to the following description.

SUMMARY OF THE INVENTION

The primary object is achieved in accordance with the invention which is a one step pressing method for fabricating a plurality of multilayer structures which includes at least one recess defined by a nonplanar surface. The method comprising the step of: (a) placing a resilient, compliant material on one or more stacks of layers including the area over the recess; and (b) applying sufficient pressure to the stacks and the resilient, compliant material to cause the compliant material to fill the recess and bond the layers together.

The method can be repeated to press additional stacks. This is accomplished by the step of: (a) placing a resilient, compliant material on one or more stacks of layers including the area over the recess; (b) applying sufficient pressure to the stacks and the resilient, compliant material to cause the compliant material to fill the recess and bond the layers together; (c) lifting the resilient, compliant material off the stack subsequent to the application of pressure; (d) providing one or more stacks of layers that have not been subjected to step (b); and (e) repeating steps (a) to (c). In a preferred embodiment of the invention the resilient, compliant material is a silicone gel and steps (a) to (d) are repeated at least ten times without the need to change the resilient compliant material. In a most preferred embodiment of the invention steps (a) to (d) are repeated at least one hundred times without a reduction in the quality of the pressing of the stacks due to a change in the resilience of the compliant material.

A second aspect of the invention is a method of making a multilayer ceramic module. The method comprises the steps of: (a) forming green tape; (b) cutting the green tape into sheets; (c) forming via holes in the sheets; (d) filling at least some of the via holes with electrically conductive paste; (e) forming patterns of electrically conductive paste on the sheet; (f) stacking and aligning the sheets to form a stack; (g) placing a deformable, resilient, compliant material on one or more stacks of layers including the area over the recess; (h) applying sufficient pressure to the stacks and the resilient, compliant material to cause the compliant material to fill the recess and bond the layers together; (i) lifting the resilient, compliant material off the stack subsequent to the application of pressure; and (j) firing the laminated sheets to sinter the green tape.

Another aspect of the invention is an electronic package formed from a plurality of laminated ceramic sheets, a patterned electrical conductor layer supported on one or more of the ceramic sheets and electrical conductors which pass through at least one ceramic sheet and connect the patterned electrical conductor layers. The electrical conductors are selected from the group consisting of gold, tungsten, silver, copper, molybdenum palladium and alloys thereof. The electronic package comprising a product formed from the steps comprising: (a) forming green tape of a dielectric material; (b) cutting the green tape into sheets; (c) forming via holes in the sheets and filling them with electrically conductive paste; (d) forming patterns of electrically conductive paste on the sheet; (e) placing a resilient, compliant material on one or more stacks of layers including the area over the recess; (f) applying sufficient pressure to the stacks and the resilient compliant material to cause the compliant material to fill the recess and cause interlayer adhesion of said layers; (g) lifting the resilient, compliant material off the stacks subsequent to the application of pressure; and (h) firing the laminated sheets to sinter the green tape.

BRIEF DESCRIPTION OF THE DRAWINGS

These and other features of the invention are further described or rendered obvious in the following related description of the preferred embodiment which is to be considered together with the accompanying drawings, wherein like numbers refer to like parts and further wherein.

It will be appreciated that, for the sake of illustration, these figures are not necessarily drawn to scale.

DETAILED DESCRIPTION

The term "resilient, compliant material" is used herein to mean a material that elastically deforms under the pressures and temperatures normally used in laminating practice. The materials ability to distort under pressure must be sufficient to cause the material to mold to the shape of the stack during pressing. Since the present application is concerned with pressing stacks of ceramic material that contain a stair-case shaped cavity, the materials ability to distort must be sufficient to (a) allow the material to assume the shape of the stair-case shaped cavity during the lamination process without deforming or rounding the edges and/or corners of the stair-case and (b) apply sufficient pressure to cause interlayer bonding of the stack.

In addition, the compliant material must be resilient; meaning that it is capable of springing back to its original size and shape after pressure is released. The resilient quality of the material is a key characteristic of the material that is required for multiple pressings. Furthermore, the resilient quality of the material will allow a single press to be used for lamination of a large variety of stacked materials having different sizes and shapes and cavities and protrusions of different sizes and shapes. The different stacks of materials may be pressed without the need to change the resilient compliant material. Alternately, the pressing unit may be sufficiently large to simultaneously laminate multiple units in a single press cycle. "Silicone gel" is one such resilient, compliant material that has been found to be useful in practicing the present invention.

The terms "lamination" and "laminating" are used herein to mean the process of applying pressure to a stack of relatively thin sheets of material to cause interlayer bonding. When the term is used in conjunction with unfired ceramic (green) tape, the pressure applied during the lamination step is not sufficient to cause the green ceramic to vitrify or sinter. Typical conditions for laminating green ceramic tape include heating at a rate of 5°–500° C./min. to a peak temperature in the range of about room temperature to about 150° C. for a period of about 1–100 seconds and applying pressure in the range 100–5,000 psi.

Figure 1:
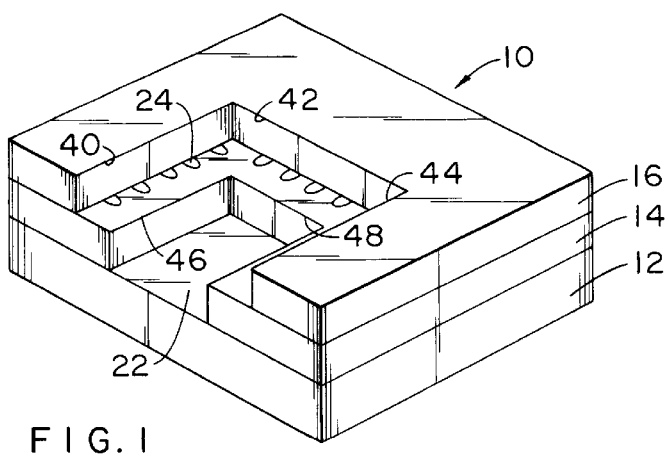
FIG. 1 is a perspective, cut-away view of a multilayer structure which may be fabricated in accordance with the invention.

Turning to FIG. 1, there is illustrated a ceramic cavity multilayer package 10 which can be fabricated in accordance with the invention. For the sake of illustration, package 10 is formed from three layers (12, 14 and 16) of ceramic material. More than 3 layers may be used in practicing the present invention and it is not necessary that adjacent layers in the stack form a step; adjacent layers may be the same size.

Layers 12, 14 and 16 of package 10 are formed by first forming a slurry by combining finely ground ceramic material with a suitable solvent and other conventional additives, such as a plasticizer and a binder, in a manner known in the art. The slurry is cast into thin "green" (unfired) tape having a thickness of about 20 to 500 microns using a conventional doctor blading process. The actual method used to fabricate the green sheet, as well as its size and thickness, is not considered to be critical to practicing the invention.

After casting, the green tape is blanked into individual sheets or cards. Typically, the green tape sheets are on the order of 200 mm square. However, the size of the green tape sheets are dependent on the size of the part that is to be manufactured and not on the invention. In addition, the invention can be used with sheets or cards of different thickness.

Via holes next are formed in the green sheets by a suitable punching process such as drilling, laser ablation, water jet, die punch or electric discharge machine (EDM). The holes suitably may have a diameter of about 125 microns. A conductor paste is applied in a desired pattern to the punched sheets using a screen printing process. The paste is also applied within the via holes to form connections between conductor patterns. The principal metallic constituent of the paste may be gold, tungsten, silver, copper, molybdenum, copper, silver/palladium alloy, gold/platinum alloy, or other suitable materials. The printed green sheets are then stacked in a desired sequence using alignment holes or other means to insure correct positioning and laminated to form a permanent bond between adjacent sheets of green tape.

The lamination step is critical to maintaining product quality including tight manufacturing tolerances which are found in the electronics industry. The layers may be laminated in a plurality of steps adding one or more new layers to the stack after each lamination. Alternatively, bladders and preforms have been proposed (see U.S. Pat. Nos. 4,636,275, 4,680,075 and 4,737,208) which fill cavity 22 during lamination.

Finally, the laminated green sheets are fired to form dense, sintered ceramic multilayer circuit substrates. In a preferred embodiment, the ceramic is a low dielectric material that has a thermal expansion coefficient (TEC) close to the semiconductor chip which will be mounted thereon. However, the ceramic materials and firing times and temperatures are chosen to produce a desired product and are not considered to be critical to practicing the invention.

Cavity 22 is formed from "windows" which are cut into layers 14 and 16. A typical cavity 22 measures approximately 0.9 cm×1.2 cm at its base and 1.0 cm×1.3 cm at the top with a height of 0.065 cm. However, the actual size and shape of the cavity is not critical to the usefulness of the invention.

Conductive pads 24 are located on the top surfaces of layer 14. The conductive pads are near the edges defining a ledge of the cavity so that electrical connections, by wire bonding to pads 24, can be made to the semiconductor chip (not shown) which is to be later mounted in cavity 22.

Figure 2:
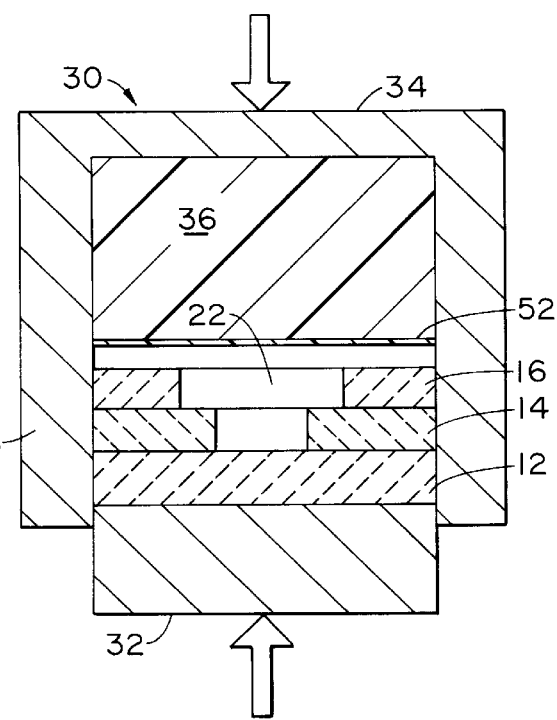
FIG. 2 is a cross-sectional view of a stack of materials in a platen press assembly of the present invention of FIG. 1 prior to pressing and/or after completion of pressing.

FIG. 2 is a cross-sectional view of a stack 10 in a platen press assembly 30 prior to lamination of the layers. Press unit 30 comprises a lower platen 32, an upper platen 34 and resilient compliant material 36.

Lower platen 32 is essentially a platform upon which the stack of layers rests during the pressing operation. Upper platen 34 is sufficiently large to apply pressure to the entire surface of stack 10. In the embodiment shown in FIG. 2, upper platen 34 has a flange 38 that extends downward and surrounds resilient compliant material 36 and stack 10. Flange 38 acts to contain resilient compliant material 36 in the area above lower platen 32 when pressure is applied during the pressing operation (see FIG. 3).

Figure 3:
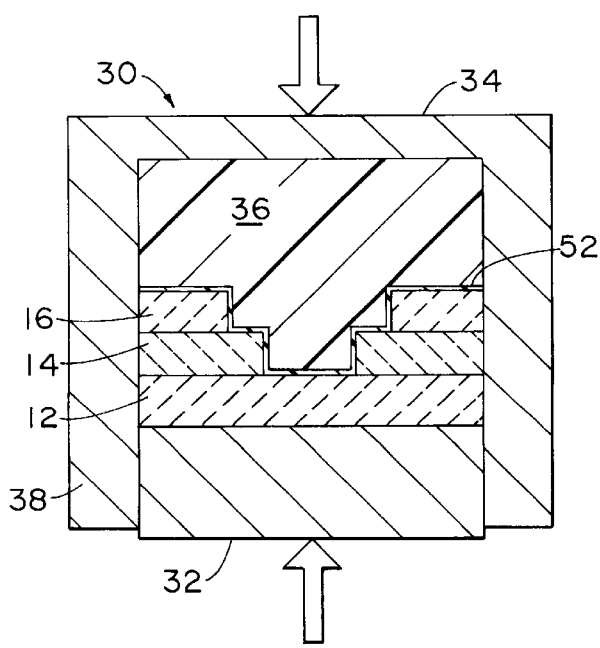
FIG. 3 is a cross-sectional view of the stack of materials in the platen press assembly of FIG. 2 in the multilayer structure of FIG. 1 during the pressing stage of the assemblies operational cycle.

As is illustrated in FIG. 3, resilient compliant material 36 elastically deforms and fills cavity 22. The ability of resilient compliant material 36 to distort and conform to the shape of the stack during pressing without significantly deforming or rounding of edges 40, 42, 44, 46 and 48 of the cavity steps of stack 10 (shown in FIG. 1).

As explained above, resilient compliant material 36 is capable of springing back to its original size and shape after pressure is released. The resilient quality of the material is a key characteristic of the material that is required for multiple pressings without a reduction in the elasticity of the material. One material that has been found useful in practicing the present invention is General Electric's Silicone RTV 6186. This material has been successfully used in the sequential lamination of over 1,000 stacks of green ceramic tape without a significant reduction in its resilient nature.

An optional template, not shown, having an opening which matches the general size and shape of cavity 22 may be placed on the top of stack 10. The primary purpose of the template is to control distribution of stresses during the bonding operation and insure that the top surface of layer 16 possesses an adequate surface finish and flatness. The template also facilitates the use of small or high aspect ratio holes or vias within stack 10. A thickness of 0.004 to 0.015 inches is useful for this function. The template material may be made of stainless steel, brass, a double-clad copper laminate or other suitable metals.

If the material of the stack to be laminated is porous, the template may also be useful in acting as a barrier to prevent penetration of the compliant material 36 into the pores of the top surface of the stack. However, it is preferred that a barrier/release material 52 be used when laminating stacks of porous materials. In addition, barrier/release material may also be needed if the stack contains binders or additives that soften or become adhesive (tacky) under the heat and pressure used during the lamination process. Chemical agents and release films can also be used to facilitate release of the compliant material, barrier/release material or template from the laminated part. Barrier/release materials, release films and chemical agents are well known in the art and are not considered to be critical to practicing the present invention.

Provided over the multilayer structure 10 is an optional barrier/release layer 52. Barrier/release layer 52 is useful if the resilient compliant material has a tendency to adhere to the top surfaces of stack 10. Barrier/release layer 52 is a thin layer of a material which will help prevent the resilient, compliant material from bonding or sticking to the underlying structure. A preferred thickness is in the range 0.0001 to 0.1 inches. If the barrier/release layer is too thin it may fracture, and if it is too thick, it will not conform to the shape of the cavity and may deform the product. In this example, the thickness was approximately 0.005 inches. Suitably, the barrier/release layer is made of a silicone rubber or any other elastomer which can withstand the temperatures and pressures that occur during lamination. A barrier/release layer is especially useful if the pressure and temperature used in the lamination step are sufficient to cause the binders within stack 10 to become sticky or tacky and to adhere to the resilient, compliant material.

The resilient, compliant material, 36 is laid on barrier/release layer 52 as the upper platen is lowered onto the stack. Thus, the barrier/release layer 52 and compliant material 36 are placed in contact with the top of the structure (in some cases it may be a template) and with each other over the entire area of the structure including all the cavities.

The resilient, compliant layer 36 should comprise a material which is capable of flowing into and conforming to the dimensions of the chip cavity during the bonding operation to be described. The material should also be thermally stable to withstand the temperature during the bonding operation. As stated above, one useful material is a silicone gel such as that sold by GE Silicones under the designation "RTV6186". In general, thicknesses of the resilient, compliant layer within the range 0.5 to 2.0 inches should be appropriate. The thickness of the resilient material must be significantly greater than the depth of the cavity. If the resilient material is too thin, it will not fill the cavity under normal pressing conditions.

Upper platen 34 is lowered into the position shown in FIG. 3 by a coventionally powered ram cylinder (not shown) which is pnuematically or hydraulically powered. The load applied to the upper and lower platens is such that the applied pressure is in the range of 100 to 5,000 psi. It should be understood that a typical lamination installation will permit the simultaneous lamination of multiple stacks of material. The pressure is maintained on platens 32 and 34 for approximately 1 to 3 minutes or even as low as 3 seconds.

While the pressure is being maintained on the stack, it may also be subjected to a heating cycle to assist in bonding the various layers together. In some applications the heating and pressure may be applied simultaneously. It is contemplated that in a production environment, the press and stack may be preheated prior to the lamination cycle. Lamination cycles will then only require enough heat to maintain the desired lamination temperature.

As shown in FIG. 3, the pressure applied to the platens cause the resilient, compliant layer, 36, to flow into and fills the cavity. The release layer, 52, stretches sufficiently without breaking to provide the necessary interface between the resilient, compliant material and the multilayer structure. The resilient, compliant layer flows into the cavity and acts as a plug to apply pressure in cavity 22.

In operation, the assembled stacks are placed on lower platen 32. Optionally, alignment pins, not shown, may prove useful in aligning layers 12, 14 and 16 and may be used to transport a stack to the lower platen or used to align an assembled stack. Alignment pins and techniques are well known in the art and are not considered to be critical to practicing the present invention.

Subsequent to the bonding cycle, the resilient, compliant and release layers are mechanically lifted off the multilayer structure. This is easily done since the release layer prevents sticking of the resilient, compliant layer to the structure. The resilient, compliant material restores itself to a shape approximating its pre-pressing shape shown in FIG. 2. The resilient compliant material can then be reused for pressing additional components. The GE Silicone material and release layer has been successfully reused over 1,000 times without a reduction in its resilient property.

The template is also mechanically lifted off the structure and can be reused. Normal processing of the ceramic packages, such as firing, brazing pins, plating and assembly of connector pins then proceeds.

Figure 4:
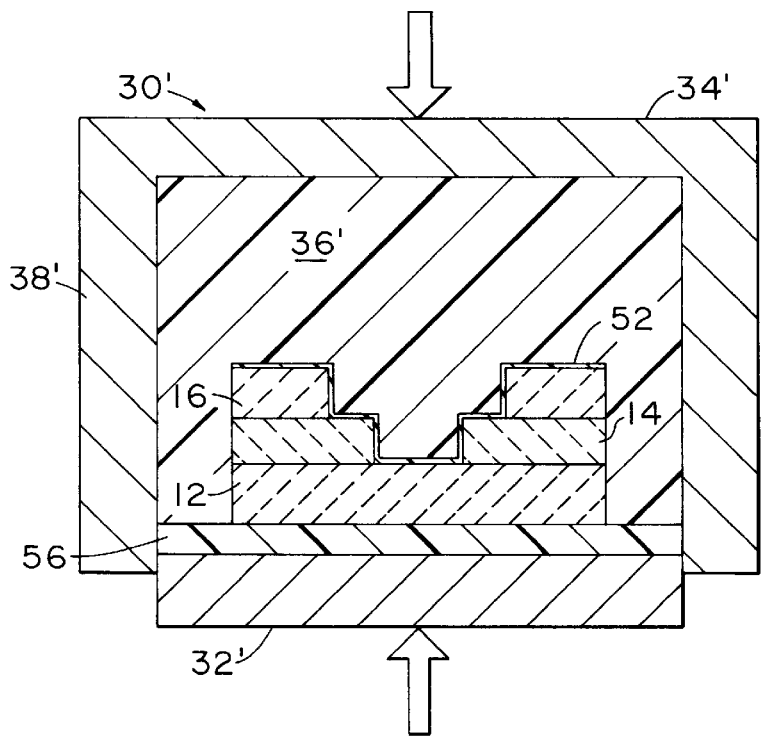
FIG. 4 is a cross-sectional view a first alternate platen press assembly of the present invention during the pressing stage of the assemblies operational cycle.

Turning next to FIG. 4, there is illustrated a first alternate platen press assembly 30' of the present invention in the pressing stage of the assemblies operational cycle. The components of assembly 30' are the same as that shown in FIG. 2. The width of lower platen 32' is greater than the width of the three layers (12, 14 and 16) of the ceramic material to be laminated. In FIG. 2, the width of lower platen 32 is just large enough to accommodate the width of the three layers (12, 14 and 16) of the ceramic material to be laminated. It is contemplated, that in commercial operation multiple separate stacks of ceramic material will be laminated simultaneously. In this event the width of lower platen 32' will be several times greater than the width of a single stack of material that is to be laminated.

FIG. 4 also includes an optional layer of resilient, compliant material 56 positioned between the stack of three layers and the lower platen 32'. This layer is not shown in FIG. 2 however, it is contemplated that it may be included in that embodiment.

In operation, compliant materials 36' and 56 of FIG. 4 completely enclose the stack of three layers during the pressing stage of the operational cycle and exert a substantially uniform load in all directions. Compliant material 36' surrounds the outer edges of layers 12, 14 and 16 as well as fills the central staircase cavity. The effect of completely surrounding the stack with compliant material is to simulate isostatic pressing without the need for a bag for each part or for holding fluid or a pumping mechanism to fill the bag. Those skilled in the art will recognize that it may be necessary to provide a porous insert between 36' and 56, or over the upper surface of the stack to provide a mechanism for evacuating air that would otherwise be trapped around the stack. Those skilled in the art will recognize that other means may be used in addition to porous inserts to avoid entrapping air during lamination.

Figure 5:
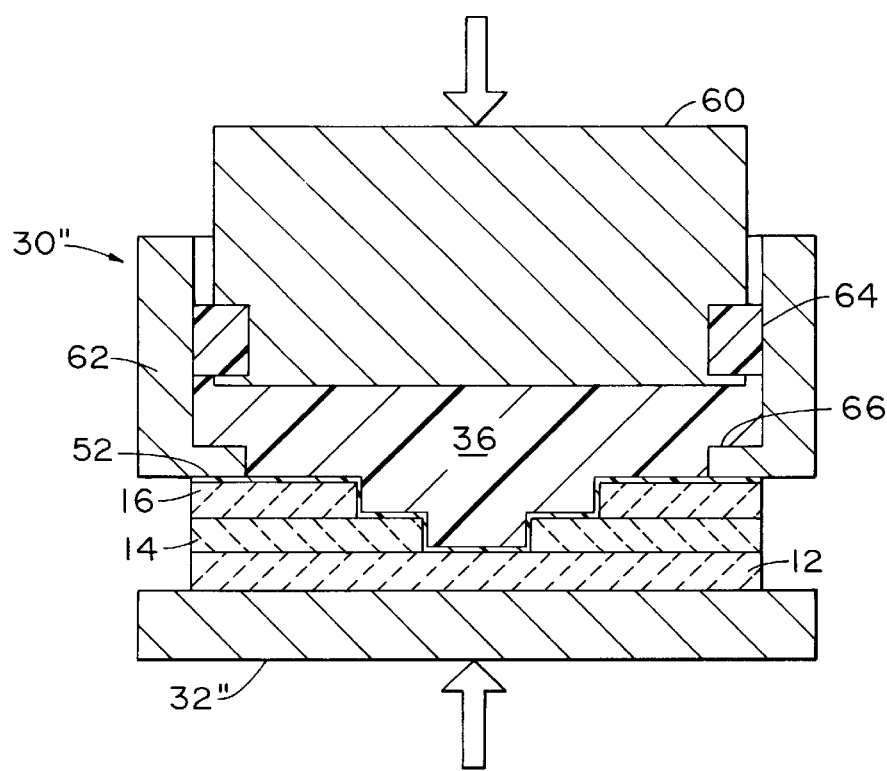
FIG. 5 is a cross-sectional view a second alternate platen press assembly of the present invention during the pressing stage of the assemblies operational cycle.

FIG. 5 is a cross-sectional view of a second alternate platen press assembly of the present invention during the pressing stage of the assemblies operational cycle. The components of assembly 30" are similar to those shown in FIG. 2. Lower platen 32" is similar to lower platen 32'. However, in FIG. 5 the upper platen is an assembly of a piston 60, a side barrier 62 and a piston seal 64. Piston 60 may be cylindrical, however its shape is not considered to be critical to practicing the invention. The inner wall of barrier 62 is sized so that piston 60 can move vertically therein and apply pressure to compliant material 36. Barrier 62 has an inner flange 66 which rests on barrier/release material 52. Piston seal 64 prevents compliant material 36 from oozing between the outer wall of piston 60 and the inner wall of side barrier 62 during the pressing stage of the assemblies operational cycle.

While the invention has been described with respect to the fabrication of a chip cavity ceramic substrate, it should be appreciated that the inventive techniques are applicable wherever multilayer structures are fabricated which require a recess or a nonplanar surface. For example, it may be desirable in some types of printed wiring boards to provide a thinner ledge around the border of a thicker board and to locate bonding pads on that ledge. In such cases, the ledge could be protected from adhesive between layers of the thicker portion of the board. Another possibility is to utilize the invention to prevent adhesive from oozing through via holes to the top of the multilayer structure.

Various additional modifications will become apparent to those skilled in the art. All such variations which basically rely on the teachings through which the invention has advanced the art are properly considered within the scope of the invention. Thus for example, while the invention has been described in terms of a stack of material three layers, stacks having more than three layers are contemplated for use in the present invention.

While the invention has been described in terms of a single cavity on one side of the a stack. The invention is not so limited. One skilled in the art will recognize that the present invention will be useful in the lamination of stacks containing multiple cavities or multiple protuberances.

In addition, the stacks or protuberances may be located on more than one side of the stack. In the event the stacks are formed with cavities on both sides, two pieces of the resilient compliant material will be used (see FIG. 4). The first piece of resilient compliant material will rest on the lower platen. The stack of material will then be placed on the first piece of resilient compliant material. The upper platen and the second piece of resilient compliant material can then be used as shown in FIGS. 2 and 3. During the pressing operation both pieces of the resilient compliant material will deform and simultaneously fill the cavities.

Furthermore, one skilled in the art will recognize the value of the invention in reducing the distortion or flattening of a conductive paste or the like that is sandwiched between two layers of material. Rigid parallel platens of the prior art will form a substantially flat laminate. When the stacks are laminated using the resilient compliant material as shown in FIG. 2, the resulting laminate bulges in areas which correspond to the patterns of the conductive paste. These bulges or "veins" of conductive paste may be fabricated with the bulge appearing on only one side (via the use of one rigid platen and one resilient compliant platen) or on both sides like the veins in a leaf (via the use of assembly as shown in FIG. 4), depending on the desired result.

It is contemplated that resilient materials other than silicone may also be used in practicing the present invention.

In addition, it is also contemplated that release agents may be sprayed or wiped onto the surface of the stack prior to placing the stack in the lamination press. Such release agents are well known in the art and include materials such as stearic acid, silicone oils and waxes such as Freekote 700 which is commercially available from Dexter Corp. of Seabrook, N.H.

While the invention has been described in terms of preferred embodiments, it is intended that all matter contained in the above description shall be interpreted as illustrative. The present invention is indicated by the broad general meaning of the terms in which the appended claims are expressed.

What is claimed is:

1. A method of fabricating a multilayer structure from a stack of layers formed from ceramic material, said stack of layers does not contain adhesive between each layer and forms at least one recess, said at least one said recess having a depth and an area, said method comprising the step of:
   (a) positioning a block of resilient, compliant material on or over at least one stack of layers including said area of said at least one recess, said block of resilient, compliant material having a thickness greater than said depth of said at least one recess; and
   (b) applying sufficient pressure to said resilient, compliant material to cause said resilient, compliant material to deform and fill said at least one recess and cause interlayer adhesion of said layers.

2. The method according to claim 1 further comprising:
   releasing said pressure and lifting said resilient, compliant material so as to remove said resilient, compliant material from said at least one stack of layers subsequent to the application of pressure;
   providing a second set of one or more stacks of layers that have not been subjected to step (b); and
   repeating steps (a) and (b) with said second set of one or more stacks of layers and said block of resilient, compliant material.

3. The method according to claim 1 which further comprises:
   releasing said pressure and lifting said resilient, compliant material so as to remove said resilient, compliant material from said at least one stack of layers subsequent to the application of pressure;
   providing a second set of one or more stacks of layers that have not been subjected to step (b); and
   repeating steps (a) and (b) with said second set of one or more stacks of layers and said block of resilient, compliant material at least ten times.

4. The method according to claim 1 further characterized by the step of:
   providing a template between said at least one stack of layers and said resilient compliant material.

5. The method according to claim 1 wherein said recess is a cavity defined by said stack of layers which is suitable for receiving a semiconductor chip therein.

6. The method according to claim 1 wherein the resilient, compliant material comprises a deformable silicone.

7. The method according to claim 1 wherein heat is applied during step (b).

8. The method according to claim 1 wherein said pressure is in a range 100–5,000 psi.

9. The method according to claim 1 in which step (a) further comprises:
   providing a release material between said resilient, compliant material and said at least one stack of layers.

10. The method according to claim 9 wherein said release material is selected from the group consisting of stearic acid, silicone oil, waxes and mixtures thereof.

11. The method according to claim 9 wherein the resilient, compliant material comprises a deformable silicone material.

12. The method of claim 1 wherein the resilient, compliant material is a silicone gel.

13. The method of claim 1 in which said block of resilient, compliant material is placed directly on said stack.

14. A method of fabricating a multilayer structure from a stack of layers formed from ceramic material, said stack of layers does not contain adhesive between each layer and forms a recess defined by layers suitable for providing a semiconductor chip therein, said recess having a depth and an area, said method including the steps of:
   (a) providing a block of resilient, compliant material on or over one or more stacks of layers including said area over the recess, said block of resilient, compliant material having a thickness greater than said depth of said recess;
   (b) applying sufficient pressure to said one or more stacks of layers to cause said resilient, compliant material to deform and fill said recess and cause interlayer adhesion of said layers;
   (c) lifting said resilient, compliant material off said one or more stack of layers subsequent to the application of pressure;
   (d) providing a second set of one or more stacks of layers that have not been subjected to step (b); and
   (e) repeating steps (a) through (d) with said second set of one or more stacks of layers and said block of resilient, compliant material.

15. The method according to claim 14 in which step (a) further comprises:
   providing a release material between said resilient, compliant material and said one or more stacks of layers.

16. The method of claim 14 wherein the resilient, compliant material is a silicone gel.

17. The method of claim 14 in which said block of resilient, compliant material is placed directly on said stack.

18. A method of making a multilayer ceramic substrate comprising the steps of:
   (a) forming green tape;
   (b) cutting said green tape into sheets;
   (c) forming via holes in said sheets;
   (d) forming patterns of electrically conductive paste on said sheets and stacking said sheets to form stacks of sheets having an area with a recess and an area without a recess, said stacks of sheets does not contain adhesive between each layer, said recess having a depth;

(e) providing a block of resilient, compliant material on or over said stacks of sheets including said area with a recess, said block of resilient, compliant material having a thickness greater than the depth of said recess;

(f) applying sufficient pressure to said stacks of sheets to cause said resilient, compliant material to deform and fill said recess and cause interlayer adhesion of said stacks of sheets;

(g) lifting said resilient, compliant material off said stacks of sheets subsequent to the application of pressure;

(h) firing said stacks of sheets.

19. The method according to claim 18 wherein the resilient, compliant material comprises a deformable silicone.

20. The method according to claim 18 wherein step (f) includes applying heat and pressure simultaneously to said resilient, compliant material.

21. The method according to claim 18 further characterized by the step of:

providing a template between said multilayer structure and said resilient compliant material.

22. The method according to claim 18 further characterized by the step of:

providing a release layer between said multilayer structure and said resilient compliant material.

23. A method of fabricating a multilayer structure from a stack of layers formed from ceramic material, said stack of layers does not contain adhesive between each layer and has at least one recess, said recess having a depth and an area, said method comprising:

(a) positioning a block of silicone gel on or over at least one stack of layers including said area of said at least one recess, said block of resilient, compliant material having a thickness greater than said depth of said at least one recess; and (b) applying sufficient pressure to cause said silicone gel to deform and fill said at least one recess and cause interlayer adhesion of said layers.

24. The method of claim 23 which further includes:

(c) releasing said pressure and lifting said gel out of said at least one recess;

(d) providing a new stack of layers that have not yet been subjected to (b); and (d) repeating (a) and (b) with a second set of at least one stack of layers and without changing the resilient and compliant nature of said block of silicone gel.

\* \* \* \* \*